H. G. BACKERMANN.
HORSE DETACHER.
APPLICATION FILED SEPT. 5, 1911.
1,033,654.
Patented July 23, 1912.
2 SHEETS—SHEET 2.
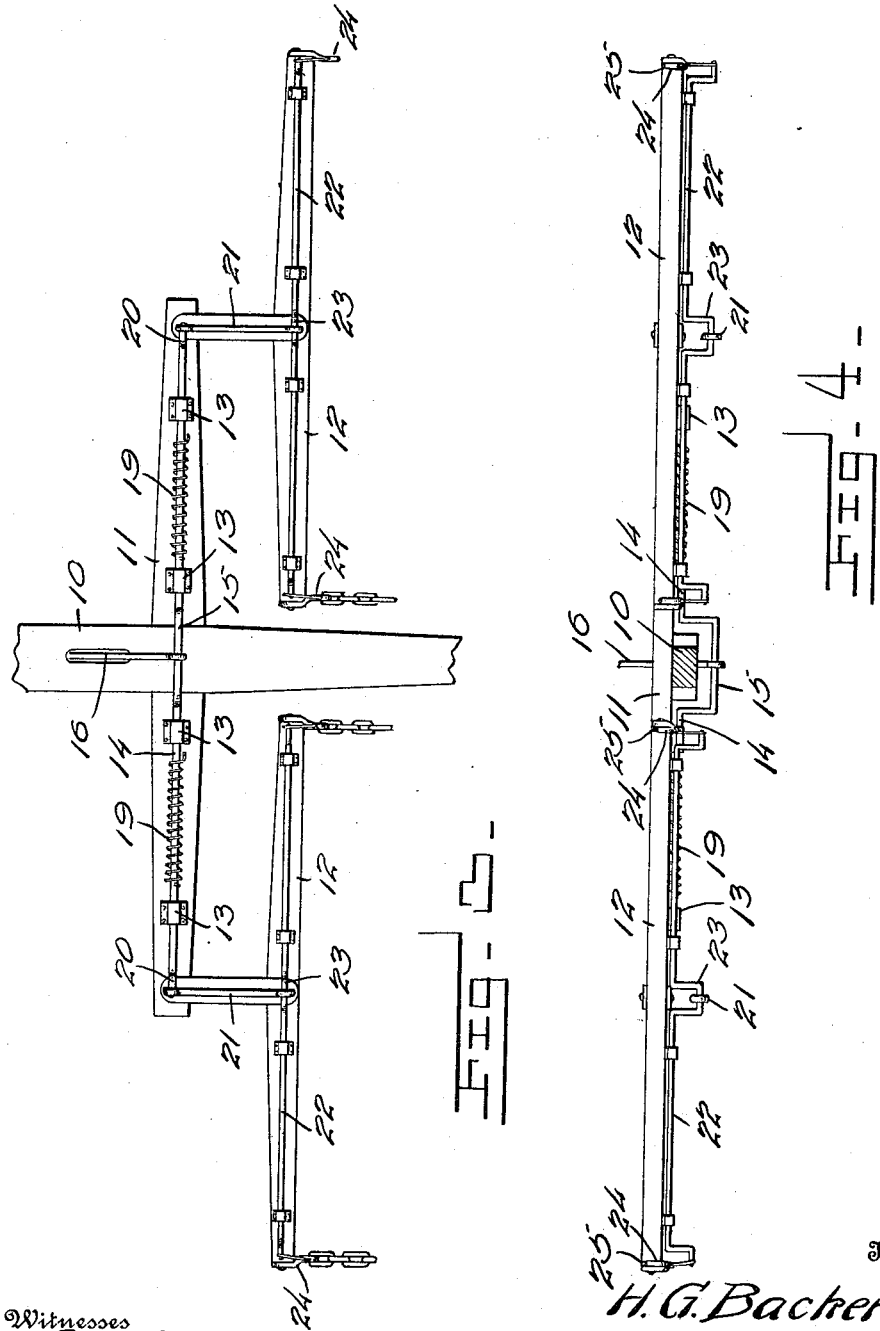
Witnesses
Inventor
H. G. Backermann,
By Harry Ellis Chandlee
Attorney

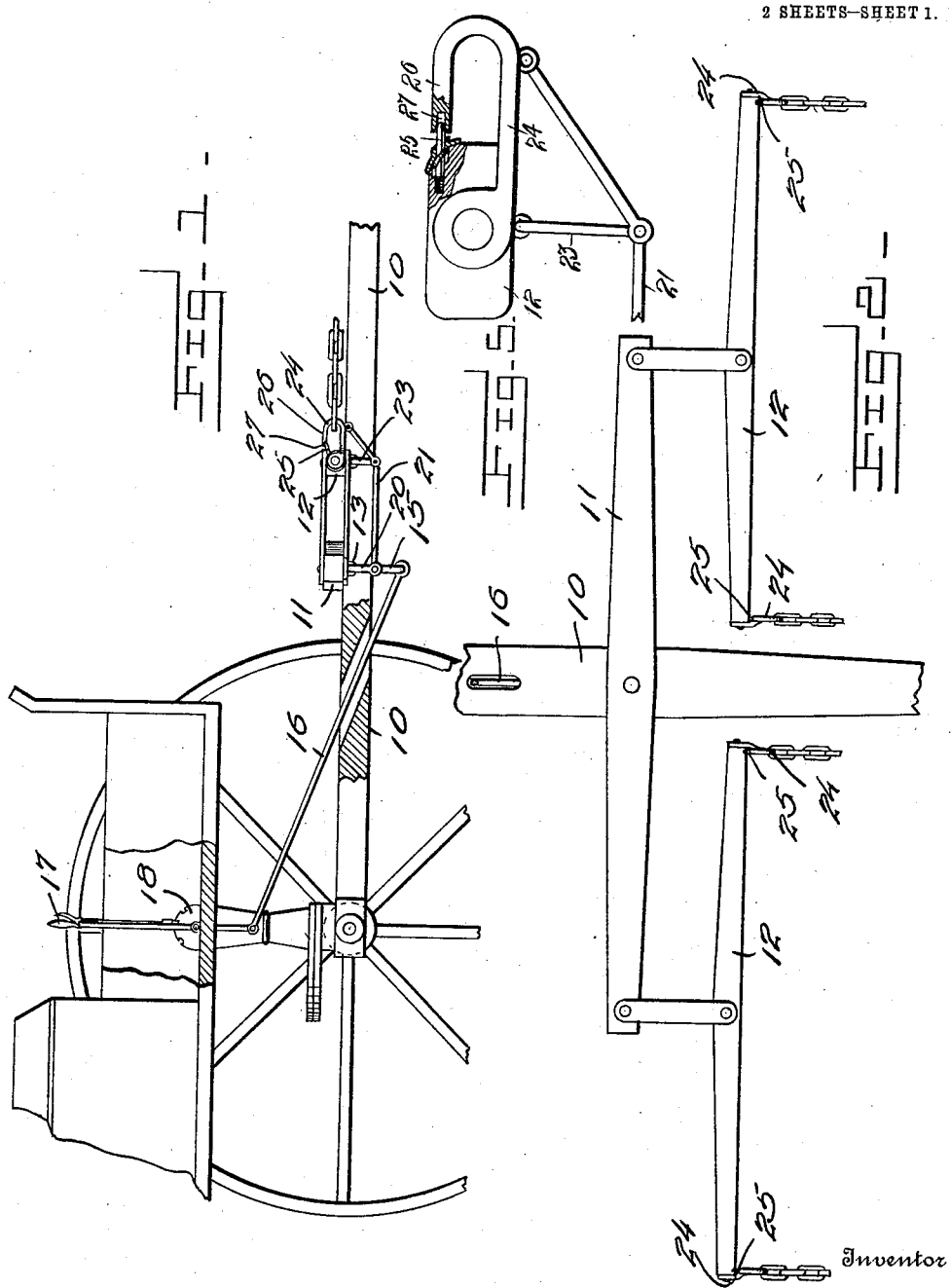

UNITED STATES PATENT OFFICE.

HENRY G. BACKERMANN, OF WESTHOFF, TEXAS.

HORSE-DETACHER.

1,033,654.  Specification of Letters Patent.  Patented July 23, 1912.

Application filed September 5, 1911. Serial No. 647,599.

*To all whom it may concern:*

Be it known that I, HENRY G. BACKERMANN, a citizen of the United States, residing at Westhoff, in the county of Dewitt and State of Texas, have invented certain new and useful Improvements in Horse-Detachers, of which the following is a specification.

This invention relates to improvements in horse detachers.

The principal object of the present invention is to provide a simple and economic structure of this character.

A further object is to provide means to prevent the accidental release of the device.

These and other objects will be apparent from the following description and with particular reference to the accompanying drawings.

In the drawings; Figure 1 is a side elevation of the device in use, Fig. 2 is a top plan view of the same, Fig. 3 is a bottom plan view of the same, Fig. 4 is a front elevation. Fig. 5 is an enlarged sectional detail of the whiffletree hook.

Referring particularly to the accompanying drawings 10 represents the reach pole of a wagon, to which is pivotally connected a doubletree 11, having the usual swingletrees 12 attached thereto. Mounted in the brackets 13, which are secured to the doubletree 11, is a shaft 14, in the center of which is formed a crank portion 15. To this crank portion is adapted to be attached a cord or rod 16, running to a point adjacent the driver's seat, where it is connected to a hand lever 17. A rack segment 18 is also provided to be engaged by the lever to hold the same in position when the brake is either applied or released.

Strong coil springs 19 are placed around the shaft 14, and have one of their ends attached to the shaft and their other ends secured to the doubletree, so that the device will be held normally in an operative position. At each end of the shaft is formed a crank arm 20, to which is connected a link 21.

On each of the swingletrees is a longitudinally extending shaft 22, formed centrally with a crank portion 23. To this crank portion is attached the other end of the link 21. Pivoted on each end of each of the swingletrees is a trace hook 24, said hooks extending normally toward the front thereof. The end of each hook engages with a spring pressed pin 25 arranged in the swingletree, to hold the trace loop securely within the hook, as clearly shown in the drawings. The shafts 14 and 22, and the brackets 13 are mounted on the under faces of the doubletree and the swingletrees, so that the arms 20 extend downwardly. Thus when the lever 17 is moved forwardly the shaft 14 will be rocked to throw the arms 20 rearward, and pull the links 21, which causes the shaft 22 to rock and carry the hooks 24 away from the pins 25. The trace loops are then easily drawn from the hooks, the open ends thereof being then presented forward. The ends of the hooks have the straight portions 26, formed with the depressions 27, which receive the rounded ends of the pins 25.

From the foregoing it will be seen that I have provided a simple device of this character, and one which will operate quickly and easily, particular attention being called to the springs 19, which hold the shaft 14 from turning, until the lever 17 is actuated.

What is claimed is:

The combination with the doubletree and swingletree of a wagon, of a shaft on the doubletree, a crank shaft formed centrally on the shaft, means connected to the crank portion for rocking the shaft, a rock shaft on each of the swingletrees, a crank portion formed centrally in the last named shaft, a crank arm on each end of the first-named shaft, a link connected to each of said crank arms and to each of the crank portions of the swingletree shafts, trace hooks pivotally mounted on the ends of the swingletree shafts, links connected to the hooks and to the crank arms of the swingletree shafts for swinging the hooks into trace releasing position and spring pressed plungers on the swingletree for engaging the free ends of the hooks.

In testimony whereof I affix my signature, in the presence of two witnesses.

HENRY G. BACKERMANN.

Witnesses:
S. P. BOOTHE,
W. C. SCHWARZ.

Copies of this patent may be obtained for five cents each, by addressing the "Commissioner of Patents, Washington, D. C."